(12) United States Patent
Gerstler

(10) Patent No.: US 11,146,146 B2
(45) Date of Patent: Oct. 12, 2021

(54) APPARATUS AND METHOD FOR COOLING ENDWINDINGS IN A ROTATING ELECTRIC MACHINE

(71) Applicant: General Electric Company, Schenectady, NY (US)

(72) Inventor: William Dwight Gerstler, Niskayuna, NY (US)

(73) Assignee: General Electric Company, Schenectady, NY (US)

( * ) Notice: Subject to any disclaimer, the term of this patent is extended or adjusted under 35 U.S.C. 154(b) by 310 days.

(21) Appl. No.: 16/190,131

(22) Filed: Nov. 13, 2018

(65) Prior Publication Data

US 2020/0153312 A1 May 14, 2020

(51) Int. Cl.
*H02K 9/19* (2006.01)
*H02K 9/193* (2006.01)

(52) U.S. Cl.
CPC ............... *H02K 9/193* (2013.01); *H02K 9/19* (2013.01)

(58) Field of Classification Search
CPC ................................. H02K 9/19; H02K 9/193
See application file for complete search history.

(56) References Cited

U.S. PATENT DOCUMENTS

| 3,788,426 A | 1/1974 | Hull, Jr. |
| 4,693,672 A | 9/1987 | Carvalho |
| 5,193,645 A | 3/1993 | Francois |
| 7,508,101 B2 | 3/2009 | Kaminski et al. |
| 8,534,044 B2 | 9/2013 | Smith |
| 8,820,478 B2 | 9/2014 | Gauthier et al. |
| 8,985,278 B2 | 3/2015 | Jinquan |
| 9,030,063 B2 | 5/2015 | Smith |
| 9,114,877 B2 | 8/2015 | Weber et al. |
| 2012/0233977 A1 | 9/2012 | Leese |
| 2014/0044525 A1 | 2/2014 | Storage et al. |
| 2017/0130605 A1 | 5/2017 | Gerstler et al. |

FOREIGN PATENT DOCUMENTS

| EP | 2573906 A2 | 3/2013 |
| WO | 9114877 A1 | 10/1991 |
| WO | 2012104152 A3 | 8/2012 |

OTHER PUBLICATIONS

Kim et al., "Distributed Turboelectric Propulsion for Hybrid Wing Body Aircraft", 2008 International powered lift conference sponsored by Royal Aeronautical society, pp. 11, Jul. 22 to Jul. 24, 2008.
Extended Search Report corresponding EP Application No. 19206291. 7-1201 dated Apr. 7, 2020.

*Primary Examiner* — Ramon M Barrera
(74) *Attorney, Agent, or Firm* — Dority & Manning, P.A.

(57) ABSTRACT

Embodiments of a heat exchanger for cooling endwindings in a rotary electric machine are provided herein. In some embodiments, a heat exchanger may include a body configured to be disposed proximate the rotor endwinding and coupled to a casing and end shield of the rotating electric machine. The body defines a cavity configured to capture a heated fluid expelled from the rotor endwinding. A channel, having a cooling fluid therein, is formed in the body and fluidly coupled to a heat sink. A rotating electric machine and method for cooling endwindings in a rotating electric machine are disclosed.

21 Claims, 6 Drawing Sheets

APPARATUS AND METHOD FOR COOLING ENDWINDINGS IN A ROTATING ELECTRIC MACHINE

BACKGROUND

The field of the disclosure relates generally to an assembly and method to improve performance of rotating electric machines. More particularly, this disclosure relates to rotor endwinding cooling and heat exchanging in rotating electric machines, such as motors and generators.

Conventional rotating electric machines, such as motors and generators used with gas and steam turbine drives, employ forged rotors of magnetic material into which slots are machined for receiving the conductive turns of field windings which are interconnected so as to produce a desired magnetic flux pattern. In order to reduce costs and machine size, machine manufacturers are continuously seeking methods of obtaining more power output from a given volume of machine. Rotor winding thermal limitations are a major obstacle toward achieving this goal. The power output rating and performance of a motor or generator is often limited by the ability to provide additional current through the rotor field winding because of temperature limitations imposed on the electrical conductor insulation. Therefore, effective cooling of the rotor winding contributes directly to the output capability of the machine. This is especially true of the rotor endwindings, where direct, forced cooling is difficult and expensive due to the typical construction of these machines. As prevailing market trends require higher efficiency and higher reliability in lower cost, higher-power density motors and generators, cooling the rotor endwindings becomes a limiting factor.

Rotors typically used in motors and generators have a rotor body which is generally made from a machined high strength solid iron forging. Axially extending radial slots are machined into the outer periphery of the rotor body at specific circumferential locations to accommodate the rotor winding. The rotor winding in these types of machines typically consists of a number of conductor bars or complete coils, each having many field turns of copper conductors. The conducting bars or coils are seated in the radial slots in a concentric pattern with, for example, two such concentric patterns in a two-pole rotor. The bars or coils are supported in the rotor body slots against centrifugal forces by metallic wedges which bear against machined dovetail surfaces in each slot. The regions of the rotor winding which extends beyond the ends (or pole faces) of the main rotor body are called "endwindings" and when necessary are supported against centrifugal forces by high strength steel retaining rings. A section of the rotor shaft forging which is located underneath the rotor endwindings is referred to as the spindle.

Thus, the rotor winding can be separated into two major regions, the rotor body region within the radial slots in the rotor, and the rotor endwinding region that extends beyond the pole face, radially spaced from the rotor spindle. This disclosure relates primarily to cooling schemes for the rotor endwinding region.

Several rotor endwinding cooling approaches have been used in the past. Most of these approaches utilize longitudinally grooved copper windings where cooling gas enters the field turns from an open cavity via inlet ports at the sides of the turns, and then flows longitudinally along the grooves to discharge locations which are typically either chimneys in the rotor body or discrete baffled discharge zones under and around the endwinding. The gas in these baffled zones is typically discharged either to the air gap (i.e., the gap between the rotor and stator) via machine slots in the pole face, or to the area outside of the centering ring via openings in the centering ring. Some schemes utilize discharges through radial holes in the retaining rings.

Lowering the operating temperature of rotary electric machines provides an increase in efficiency by permitting the windings to carry more current, leading to greater power output. As the rotor winding, and in particular rotor endwinding, thermal limitations are a major obstacle toward achieving this goal, more effective rotor endwinding cooling schemes are desired.

BRIEF DESCRIPTION

Aspects and advantages of the disclosure are set forth below in the following description, or may be obvious from the description, or may be learned through practice of the disclosure. Embodiments of an apparatus and method for cooling endwindings in a rotating electric machine are provided herein.

In one aspect, a rotor endwinding cooling assembly of a rotating electric machine is provided. The rotor endwinding cooling assembly includes a body configured to be disposed proximate the rotor endwinding and coupled to a casing and end shield of the rotating electric machine and a channel formed in the body. The body defines a cavity configured to capture a heated fluid expelled from the rotor endwinding. The channel is fluidly coupled to a heat sink.

In another aspect, a rotating electric machine is provided. The rotating electric machine includes a rotor shaft formed about a longitudinal axis of rotation, a rotor body disposed about the rotor shaft and coupled thereto, a stator body disposed about the rotor body and a heat exchanger disposed proximate the rotor endwindings. The rotor body includes a plurality of circumferentially-spaced, axially extending slots for receiving one or more conductors which extend axially beyond an end face of the rotor body to form one or more rotor endwindings. The stator body includes a plurality of circumferentially-spaced, axially extending slots for receiving one or more conductors which extend axially beyond an end face of the stator body to form one or more stator endwindings. The heat exchanger includes a body configured to be disposed proximate the rotor endwinding and a channel formed in the body. The body defines a cavity configured to capture a heated fluid expelled from the rotor endwinding. The channel is fluidly coupled to a heat sink.

In yet another aspect, a method for cooling endwindings in a rotating electric machine is provided. The method for cooling endwindings in a rotating electric machine includes rotating a rotor body to expel a heated fluid from a rotor endwinding and capturing the heated fluid expelled from the rotor endwinding in a heat exchanger coupled to a casing and end shield of the rotating electric machine and disposed proximate the rotor endwindings.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

DRAWINGS

These and other features, aspects, and advantages of the present invention will become better understood when the following detailed description is read with reference to the accompanying drawings in which like characters represent like parts throughout the drawings, wherein:

FIG. 1 cross-sectional view of a portion of the end turn region of a dynamoelectric machine rotor with a stator in opposed facing relation thereto, in accordance with one or more embodiments shown or described herein;

Figure 1:
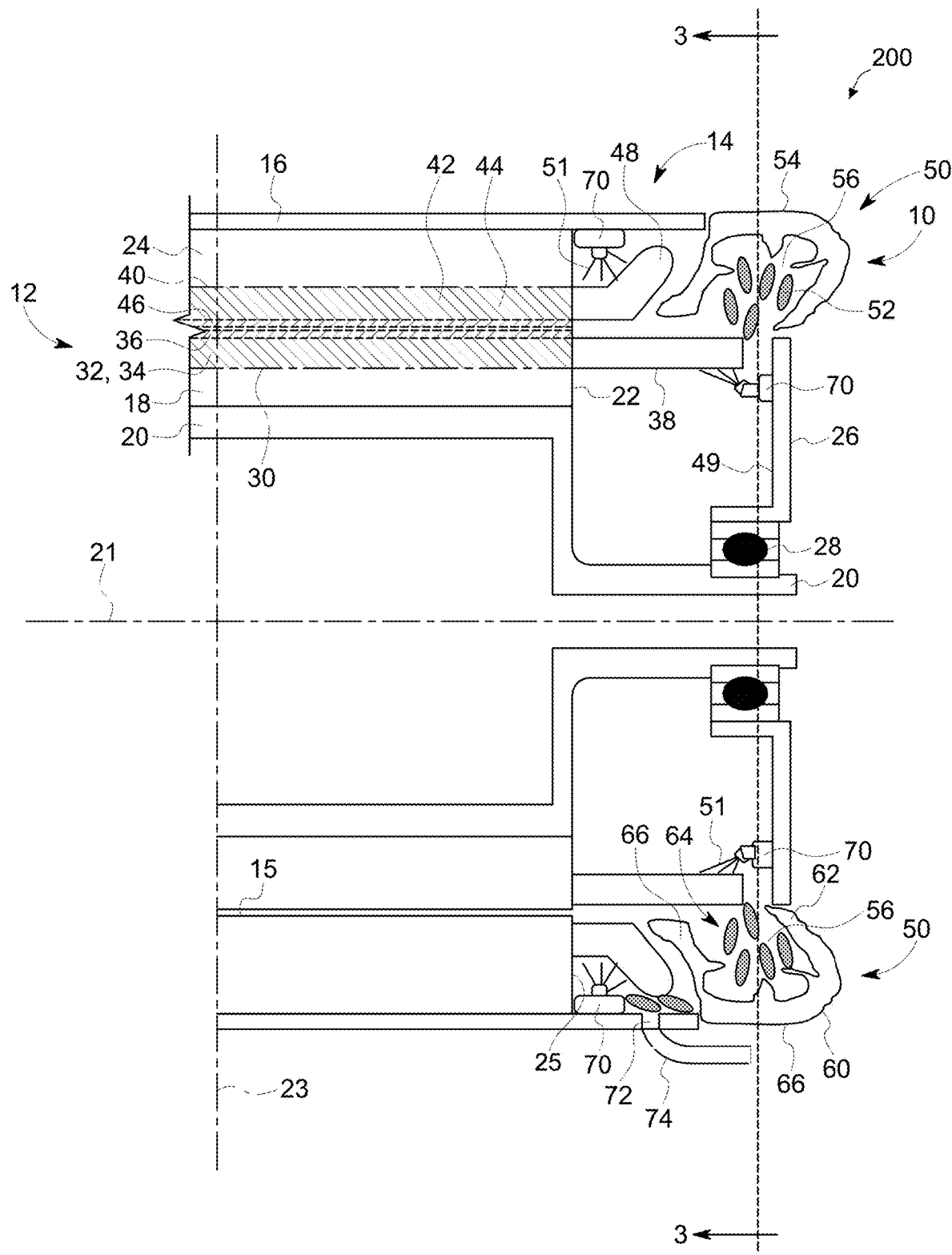

Unless otherwise indicated, the drawings provided herein are meant to illustrate features of embodiments of this disclosure. These features are believed to be applicable in a wide variety of systems comprising one or more embodiments of this disclosure. As such, the drawings are not meant to include all conventional features known by those of ordinary skill in the art to be required for the practice of the embodiments disclosed herein.

It is noted that the drawings as presented herein are not necessarily to scale. The drawings are intended to depict only typical aspects of the disclosed embodiments, and therefore should not be considered as limiting the scope of the disclosure. In the drawings, like numbering represents like elements between the drawings.

DETAILED DESCRIPTION

In the following specification and the claims, reference will be made to a number of terms, which shall be defined to have the following meanings.

"Combination" is inclusive of blends, mixtures, alloys, reaction products, and the like. Furthermore, the terms "first," "second," and the like, herein do not denote any order, quantity, or importance, but rather are used to distinguish one element from another. The singular forms "a", "an", and "the" include plural references unless the context clearly dictates otherwise and are not intended to denote a limitation of quantity, but rather denote the presence of at least one of the referenced item.

"Optional" or "optionally" means that the subsequently described event or circumstance may or may not occur, and that the description includes instances where the event occurs and instances where it does not.

Approximating language, as used herein throughout the specification and claims, may be applied to modify any quantitative representation that could permissibly vary without resulting in a change in the basic function to which it is related. Accordingly, a value modified by a term or terms, such as "about", "approximately", and "substantially", are not to be limited to the precise value specified and has the meaning dictated by context, (e.g., includes the degree of error associated with measurement of the particular quantity). In at least some instances, the approximating language may correspond to the precision of an instrument for measuring the value. Here and throughout the specification and claims, range limitations may be combined and/or interchanged. Such ranges are identified and include all the sub-ranges contained therein unless context or language indicates otherwise.

Reference throughout the specification to "one embodiment", "some embodiments", "another embodiment", "an embodiment", and so forth, means that a particular element (e.g., feature, structure, and/or characteristic) described in connection with the embodiment is included in at least one embodiment described herein, and may or may not be present in other embodiments. In addition, it is to be understood that the described elements may be combined in any suitable manner in the various embodiments.

Embodiments of a rotor endwinding cooling assembly are provided herein. In at least some embodiments, the rotor endwinding cooling assembly may advantageously allow for an extraction of heat proximate the rotor endwindings, thereby reducing or eliminating instances of unintentional heating of components that is typically observed in conventional heat thermal circuits that require the transport of heated oil throughout the engine. In addition, by reducing heating of other engine components, an overall heat transfer burden on the system is reduced, thus making the entire systems lighter and smaller in volume, and as such, provides a reduction in both the weight and drag on the engine. Moreover, in at least some embodiments, the inventive heat exchanger provides a mechanism for a controlled collection of oil expelled or slung from the rotor endwindings as compared to conventional systems that require collection of oil expelled or slung from the rotor endwindings from within the machine casing via conduits for cooling in a remotely located heat exchanger.

Referring to the drawings wherein identical reference numerals denote the same elements throughout the various views, FIG. 1 illustrates a portion of a rotating electric machine 10, such as a motor or generator, or any other rotating electrical device, formed about a longitudinal axis of rotation 21 and having a plane of symmetry 23. The machine 10 includes a rotor 12 and a stator 14 disposed about and surrounding the rotor 12. More specifically, the stator 14 has an annular structure with a bore 15, in which the rotor 12 is housed. The rotor 12 and stator 14 are depicted as disposed within a casing 16. The rotor 12 includes a generally cylindrical rotor body portion 18 centrally disposed on a rotor shaft 20. The rotor body portion 18 includes axially opposing end faces, of which a portion 22 of one end face is shown in FIG. 1. The stator 14 includes a generally cylindrical stator body portion 24 centrally disposed about the rotor 12 and a stator end shield 26 coupled to the rotor shaft 20 via a bearing 28.

The rotor body portion 18, or rotor core, is provided with a plurality of circumferentially-spaced, axially extending slots 30 (extending parallel to the longitudinal axis of rotation 21) for receiving concentrically arranged conductors, and more particularly for receiving conductor coils or bars, that are connected at their ends to define rotor windings 32.

In an embodiment, a number of conductor bars 34 constituting a portion of the rotor winding 32 are stacked one on top of the other in each one of the slots 30. For clarity, only one rotor bar 34 is shown in FIG. 1, although several more are commonly used in practice. Adjacent conductor bars 34 are separated by layers of electrical insulation (not shown). The stacked conductor bars 34 are typically maintained in the slots by wedges 36 and are made of a conductive material such as copper. The conductor bars 34 are interconnected at each opposing end of the rotor body portion 18 by end turns, which extend axially beyond the end faces 22 to form rotor endwindings 38.

As previously alluded to, conductor coils could be housed in the slots 30 (usually for smaller machines). In the following, specific reference to conductor bars is made, but it should be understood that conductor coils disposed in the slots 30 and forming rotor endwindings 38 may be used. Examples of coil conductor types include random wound wire and litz wire.

Similar to the rotor 12, the stator body portion 24, or stator core, is provided with a plurality of circumferentially-spaced, axially extending slots 40 (extending parallel to the longitudinal axis of rotation 21) for receiving concentrically arranged conductors, and more particularly for receiving conductor coils or bars, that are connected at their ends to define stator windings 42. Similar to the rotor windings 32, in an embodiment, the stator windings 42 include a number of conductor bars 44, constituting a portion of the stator winding 42, are stacked one on top of the other in each one of the slots 40 and in a manner described with regard to the rotor windings 32. The stacked conductor bars 44 are typically maintained in the slots 40 by wedges 46 and are made of a conductive material such as copper. The conductor bars 44 are interconnected at each opposing end of the stator body portion 24 by end turns, which extend axially beyond an end face 25 the stator body portion 24 to form stator endwindings 48. As previously alluded to with regard to the rotor windings 32, coils could be housed in the slots 40 (usually for smaller machines) to form the stator endwindings 48. The stator end shield 26 is adapted to be mounted on the end of the stator 14. The end shield 26 has an inner face 49, which faces the rotor end windings 38 and the stator end windings 48.

In a rotating electric machine, such as machine 10, the rotor endwindings and stator endwindings generate a significant amount of heat, thereby creating a significant heat load burden on the machine. Conventionally utilized mechanisms to remove heat (e.g., thermal circuits) are insufficient to efficiently remove the amount of heat generated by the endwindings. For example, conventional thermal circuits typically rely on a circumferential oil manifold equipped with circumferentially disposed oil spray nozzles, that spray the rotor endwindings and the stator endwindings for cooling during operation. During operation, the rotor endwindings expel or sling the oil radially outward for collection on an interior of the casing wall, while the stator endwindings provide for the oil to drip gravitationally around the casing. One or more collection ports are formed in the casing for transport of the heated oil from the endwindings to a heat exchanger disposed in a separate location within the rotary electric machine via a plurality of conduits. However, such systems are inefficient and may result in unintended heating of other components of the machine as the heated oil is moved about. In addition, adapting such a conventionally utilized system to remove the amount of heat generated by the endwindings would require a significant addition of weight to the machine, and thus, an increased drag on the machine (e.g. motor, generator).

To improve field endwinding cooling effectiveness, in an embodiment of the disclosure, a rotor endwinding cooling assembly 200, and more particularly a heat exchanger 50 may be disposed proximate the rotor endwindings 38. Locating the heat exchanger 50 in such a manner provides for the heat to be extracted from a heated oil 52 that is slung or expelled from the rotor endwindings 38 at a location that is proximate, or at, the heat source (e.g., rotor endwindings 38), thereby maximizing the effectiveness of the heat exchanger 50 by creating a maximum obtainable difference in temperature ($\Delta T$) between the heated oil 52 and the heat exchanger 50. Moreover, extracting heat proximate the heat source (e.g., rotor endwindings 38) reduces or eliminates instances of unintentional heating of machine components typically observed in conventional heat thermal circuits that require the transport of heated oil shed from the rotor endwindings 38 throughout the machine 10. In addition, by reducing heating of other machine components, an overall heat transfer burden on the system is reduced, thus making the entire systems lighter and smaller in volume, and as such, provides a reduction in both the weight and drag on the machine 10.

Although the rotor endwindings 38 are described above as the heat source from which the heat exchanger 50 extracts heat, it is to be understood that the heat exchanger 50 may be utilized to remove heat from any heat source within the machine. The heat exchanger 50 may be disposed in any location proximate the heat source that is suitable to remove a desired amount of heat from a heated fluid.

Figure 2:
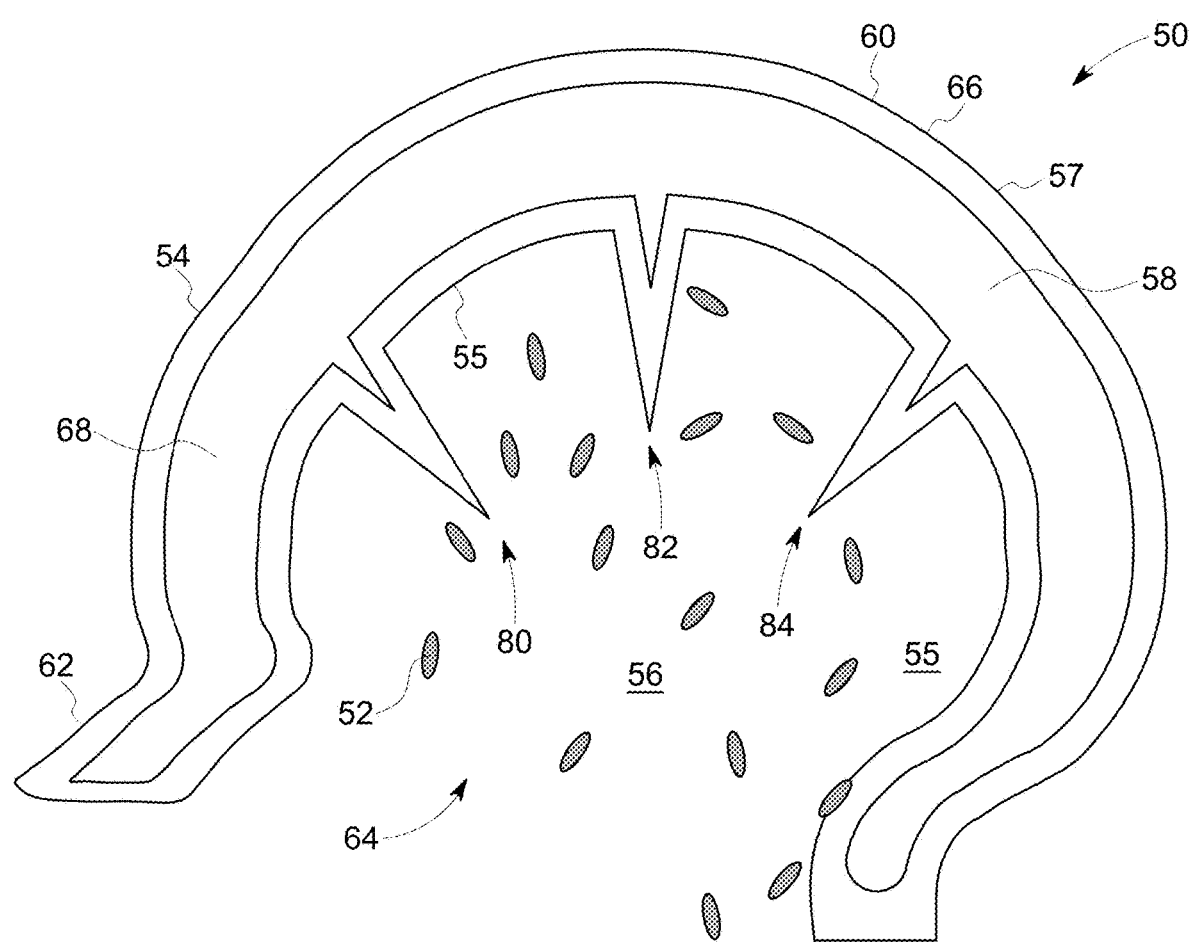
FIG. 2 is a partial cross-sectional view of an exemplary rotor endwinding cooling assembly, in accordance with one or more embodiments shown or described herein.

As illustrated in FIGS. 1 and 2, the heat exchanger 50 may generally comprise a body 54 defining a cavity 56 and a channel 58 disposed within the body 54. The body 54 may be statically disposed proximate the rotor endwindings 38 and supported by one or more components of the engine. For example, in an embodiment, the heat exchanger 50, and more particularly, the body 54 is supported by a portion of the casing 16 and the stator end shield 26, such as shown in FIG. 1. The body 54 may be fabricated from any material suitable to withstand operating conditions within the machine 10 and provide a desired heat transfer between the heated oil 52 that is expelled or shed from the rotor endwindings 38 and a cooling fluid (described presently), for example, such as steel, titanium, or cobalt based alloys.

Figure 4:
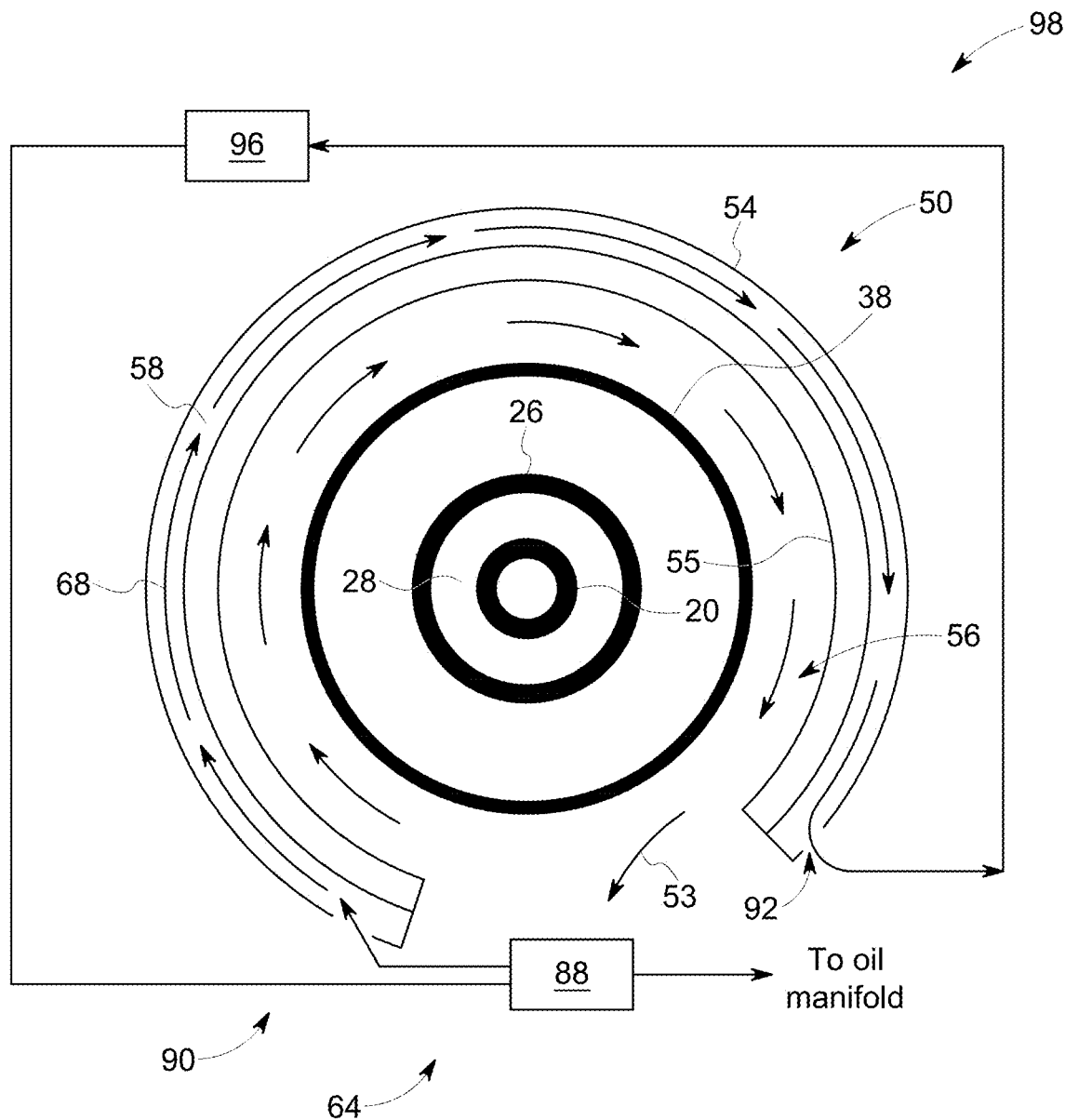
FIG. 4 is a partial cross-sectional view of an exemplary rotor endwinding cooling assembly, in accordance with one or more embodiments shown or described herein.
Figure 5:
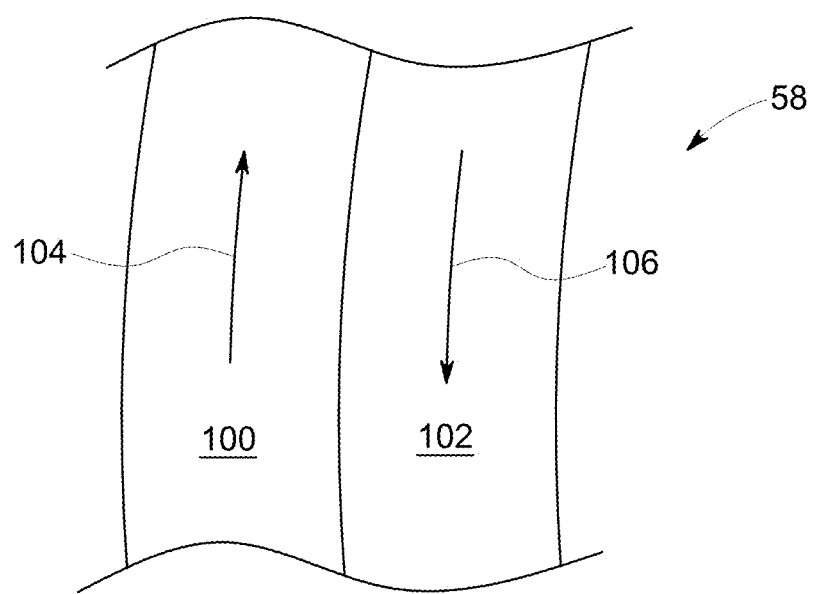
FIG. 5 is a partial cross-sectional view of an exemplary rotor endwinding cooling assembly, in accordance with one or more embodiments shown or described herein.

The body 54 may have any cross-sectional shape suitable to trap and/or contain oil expelled or shed by the rotor endwindings 38, for example, such as a modified oil scoop. For example, as best illustrated in FIG. 2, in some embodiments, the body 54 may comprise a first portion 60 having a concave shape and a second portion 62 extending from the first portion 60, wherein the second portion 62 forms an inlet 64 that is fluidly coupled to the cavity 56. In addition, the body 54 may have an annular shape formed about the axis of rotation 21 (FIG. 1), such as shown in FIGS. 2, 4 and 5. The body 54 may conform or be contoured to a peripheral edge of the rotor endwindings 38, the casing 16 and the stator end shield 26 so as to be supported and disposed proximate the rotor endwindings 38. By surrounding or encircling at least a portion of the rotor endwindings 38 with the body 54 allows for a controlled collection of the heated oil 52 as it is expelled or slung off of the rotor endwindings 38 as compared to conventional systems that allow unrestricted distribution of the heated oil 52 about various surfaces of the casing 16 for transport to a remote heat exchanger.

Referring more specifically to FIG. 2, the channel 58 provides a conduit to facilitate a flow of a cooling fluid 68 throughout the body 54. The channel 58 may be shaped, sized or configured in any manner sufficient to provide a desired flow of the cooling fluid 68 throughout the body 54. The cooling fluid 68 may be any fluid suitable to facilitate the extraction of heat from the heated oil 52, that is expelled or slung from the rotor endwindings 38, such as an oil, poly-alpha-olefin (PAO), water, glycol, combinations thereof, or the like.

In some embodiments, a thermally insulating coating 66 may be disposed on an outer surface 57 of the body 54. When present, the thermally insulating coating 66 may prevent heat flow from the surrounding ambient temperature and/or other machine components to the cooling fluid 68 flowing through the channel 58.

The heated oil 52 that is shed in a radially outward direction from the rotor endwindings 38 may be directed towards the body 54 of the heat exchanger 50 in response to positioning of the heat exchanger 50 relative to the rotor endwindings 38.

Referring again to FIG. 1, during operation, a circumferential oil manifold (not shown) is equipped with a plurality of circumferentially disposed oil spray nozzles 70, that spray the rotor endwindings 38 and the stator endwindings 48 with oil 51 for cooling. The stator endwindings 48 provide for the oil 51 that is sprayed thereon for cooling to drip gravitationally around the casing 16 as heated oil 52. One or more collection ports 72 are formed in the casing 16 for transport of the heated oil 52 from the stator endwindings 48 to a heat exchanger (not shown) disposed in a separate location within the rotary electric machine 10 via a plurality of conduits 74.

During operation, the oil 51 that is sprayed on the rotor endwindings 38 is expelled or slung radially outward by the rotor endwindings 38 for collection in the cavity 56 of the heat exchanger 50. More specifically, the heated oil 52 enters the cavity 56 of the body 54 and comes in contact with a cooling surface (e.g., the inner surface 55 of the body 54). Heat is then extracted from the heated oil 52 via the cooling fluid 68 flowing through the channel 58 of the body 54. In some embodiments, the at least partially cooled oil may then be directed towards at least one of a sump, the oil manifold, an additional thermal circuit, or into the channel 58, described presently. Such embodiments are described below with respect to FIGS. 4 and 5.

Referring again to FIG. 2, although shown as a continuous or flat surface, the inner surface 55 of the heat exchange body 54 may comprise one or more features (e.g., fins, vanes, protrusions, or the like), for example a plurality of features 80, 82, 84 shown in FIG. 2. When present, the features 80, 82, 84 may provide an increased surface area to facilitate the transfer of heat from the heated oil 52 to the cooling fluid 68 disposed in the channel 58. The features 80, 82, 84 may be configured, sized or shaped in any manner suitable to provide the aforementioned increased surface area. In some embodiments, the size or shape of the features may be influenced by a desired balance between surface area and a pressure drop of the oil 52 flowing through the cavity 56 and the cooling fluid 68 flowing through the channel 58.

Figure 3:
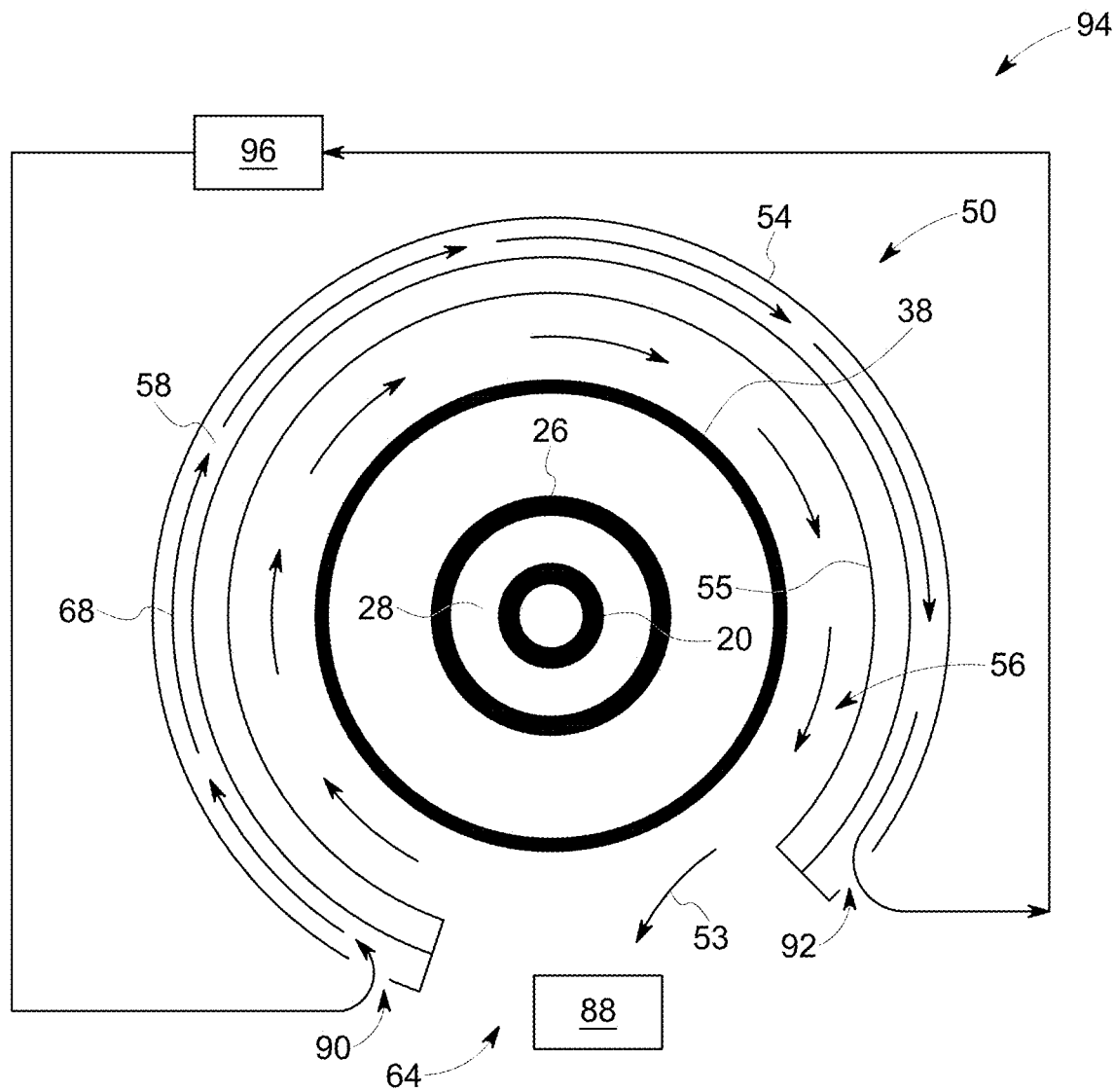
FIG. 3 is a partial cross-sectional view of an exemplary rotor endwinding cooling assembly, in accordance with one or more embodiments shown or described herein.

Referring to FIG. 3, illustrated is a partial cross-sectional view taken through line 3-3 of FIG. 2. As illustrated, in some embodiments, a sump 88 may be disposed proximate the heat exchanger 50. When present, the sump 88 functions to collect the cooled oil 53 exiting the cavity 56 after it has been cooled (as described above). The cooled oil 53 may then be directed to the oil manifold (not shown) and oil spray nozzles 70 (FIG. 1) to provide cooling for the rotor endwindings 38 and stator endwindings 48. In some embodiments, the body 54 may comprise an inlet 90 and outlet 92 fluidly coupled to the channel 58. When present, the inlet 90 and outlet 92 allow the cooling fluid 68 to enter and exit the channel 58.

In some embodiments, the channel 58 and cavity 56 may be isolated from one another, for example, such as shown in FIG. 3. In such embodiments, the cooling fluid 68 flows through a separate thermal circuit 94 and, is thus, separate from the sump 88 and the heated oil 52 (FIG. 2). For example, the cooling fluid 68 may be provided to the channel 58 at the inlet 90. The cooling fluid 68 then flows through the channel 58 and exits the channel 58 at the outlet 92. As described above, heat is extracted from the heated oil 52 flowing through the cavity 56 and impinging on the inner surface 55 of the body 54 via the cooling fluid 68 flowing through the channel 58 of the body 54. As the cooling fluid 68 extracts heat from the heated oil 52, the cooling fluid 68 is heated. Upon exiting the channel 58 at the outlet 92 the heated cooling fluid 68 may be passed through an additional heat exchanger (heat sink) 96 of the thermal circuit 94, where the heated cooling fluid 68 is cooled. The cooled cooling fluid 68 may then be returned to the inlet 90 of the channel 58.

Alternatively, in some embodiments, the heated oil 52 may serve as the cooling fluid and, in such embodiments, a common thermal circuit 98 is utilized, for example, such as shown in FIG. 4. In such embodiments, the heated oil 52 that is expelled or slung from the rotor endwindings 38 and cooled via the cooling mechanism of the cavity 56 (e.g., as described above) exits the cavity 56 and is collected by the sump 88 as a cooled oil 53. The cooled oil 53 may then be directed to the oil manifold (not shown) and oil spray nozzles 70 (FIG. 1) to provide cooling for the rotor endwindings 38 and stator endwindings 48 or directed to the channel 58 to function as the cooling fluid 68. When directed to the channel 58, the cooled oil 53 enters the channel 58 via the inlet 90 and flows through the channel 58 and extracts heat from the heated oil 52 flowing through the cavity 56, thereby being heated. The cooled oil 53, now heated, then exits the channel 58 via the outlet 92 and may be passed through an additional heat exchanger (heat sink) 96, where it is cooled and subsequently returned to the sump 88.

Although the channel 58 is shown as having a single flow path in FIGS. 3 and 4, the channel 58 may be configured in any manner suitable to provide the extraction of heat from the heated oil 52 as described herein. For example, referring to FIG. 5, in some embodiments, the channel 58 may comprise a plurality of flow paths (two flow paths 100, 102 shown). In such embodiments, the flow paths 100, 102 may be configured such that the cooling fluid 68 in adjacent flow paths 100, 102 flows in opposite directions (flow of cooling fluid 68 in each flow path 100, 102 indicated by arrows 104, 106, respectively). In some embodiments, the flow paths 100, 102 may be fluidly coupled to one another and arranged in alternating or recursive patterns throughout the channel 58.

Figure 6:
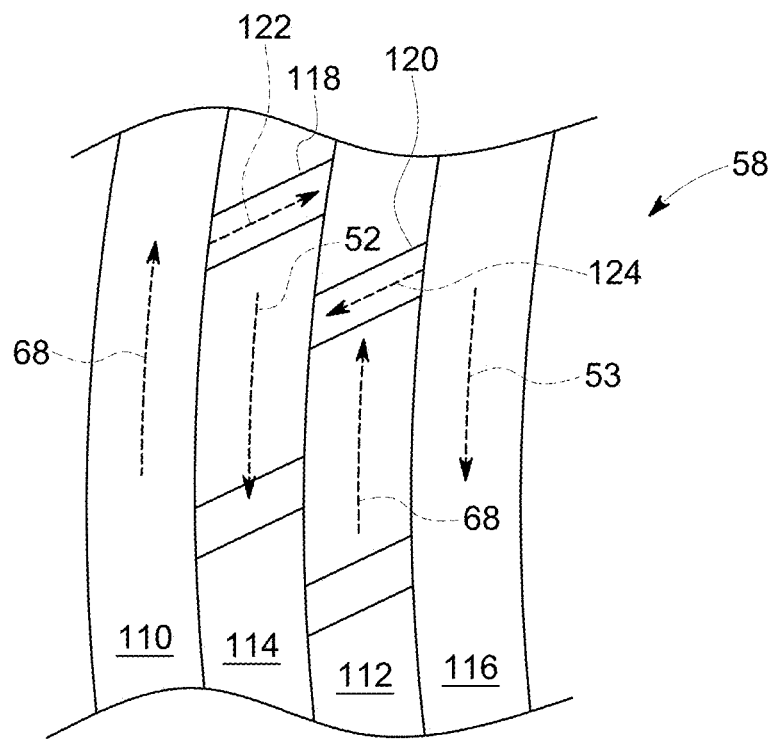
FIG. 6 is a partial cross-sectional view of an exemplary rotor endwinding cooling assembly, in accordance with one or more embodiments shown or described herein.

Referring to FIG. 6, in some embodiments, the channel 58 may comprise a first set of flow paths 110, 112 and a second set of flow paths 114, 116, wherein the flow paths of each set are coupled to one another via a plurality of conduits 118, 120. In such embodiments, the presence of the plurality of conduits 118, 120 allow for a cooled flow of oil 53 and/or cooling fluid 68 to flow across a heated flow of oil 52 and/or cooling fluid 68, thereby providing a cross-flow heat exchanging arrangement. For example, cooled cooling fluid 68 may flow through a first flow path (flow path 110) that is adjacent to a heated oil 52 flow in a second flow path (flow path 114). The cooled cooling fluid 68 may also flow (indicated by arrow 122) from the first flow path (flow path 110) across the second flow path 114 to a third flow path (flow path 112). Such a flow of the cooling fluid 68 across the second flow path 114 functions to extract heat from the heated oil 52 flowing in the second flow path 114. Similarly, cooled oil may flow through a fourth flow path (flow path 116) adjacent to the heated cooling fluid in the third flow path 112. The cooled oil 53 may also flow (indicated by arrow 124) from the fourth flow path 116 across the third flow path 112 to the second flow path 114. Such a flow of the oil across the third flow path 112 functions to extract heat from the heated cooling fluid flowing in the third flow path 112.

Figure 7:
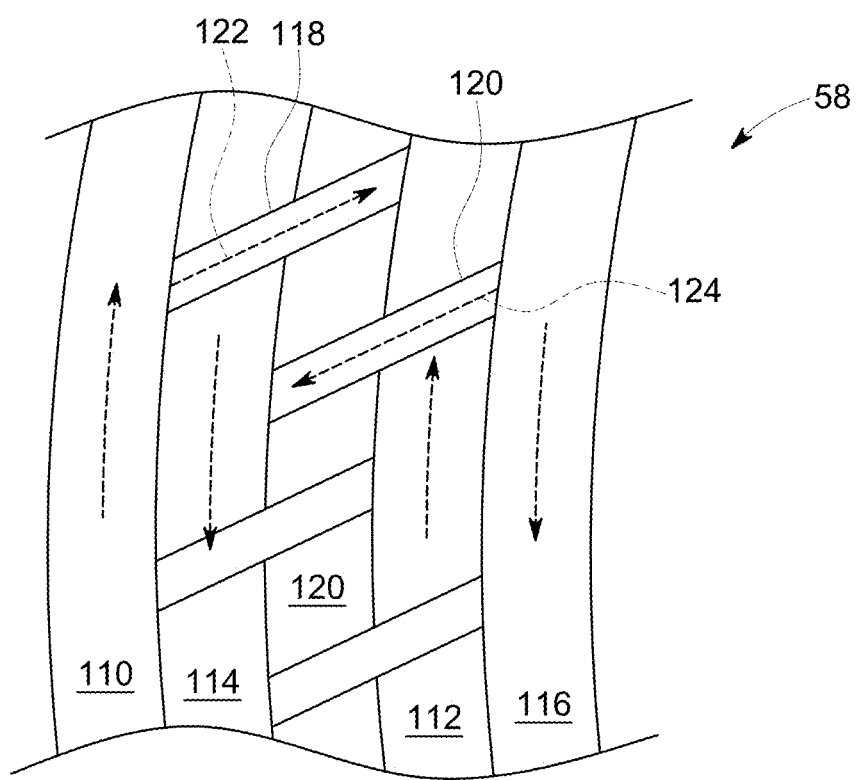
FIG. 7 is a partial cross-sectional view of an exemplary rotor endwinding cooling assembly, in accordance with one or more embodiments shown or described herein.

Referring to FIG. 7, in some embodiments, one or more channels (e.g., channel 120) may be disposed between two or more of the flow paths (e.g., flow paths 114, 112), wherein the channel 120 does not have cooling fluid or oil disposed therein. Although only a limited number of shown flow paths and conduits are shown in FIGS. 5-7, any number of flow paths and conduits may be present and may be arranged in any manner suitable to provide the exchange of heat as provided herein.

Thus, embodiments of an apparatus for oil collection and heat exchanging for rotor endwindings of rotating electric machines has been provided herein.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from essential scope thereof. Therefore, it is intended that the disclosure not be limited to the particular embodiment disclosed as the best mode contemplated for carrying out this disclosure, but that the disclosure will include all embodiments falling within the scope of the appended claims.

The invention claimed is:

1. A rotor endwinding cooling assembly of a rotating electric machine, the rotor endwinding cooling assembly comprising:
   a body configured to be disposed proximate the rotor endwinding and coupled to a casing and an end shield of the rotating electric machine, wherein the body defines a cavity configured to capture a heated fluid expelled from the rotor endwinding; and
   a channel formed in the body, the channel fluidly coupled to a heat sink.

2. The rotor endwinding cooling assembly of claim 1, wherein the body comprises:
   a first portion having a concave shape; and
   a second portion coupled to the first portion, the second portion forming an inlet, wherein the inlet is fluidly coupled to the cavity.

3. The rotor endwinding cooling assembly of claim 1, further comprising a thermally insulating coating disposed on an outer surface of the body.

4. The rotor endwinding cooling assembly of claim 1, further comprising a sump disposed proximate the body.

5. The rotor endwinding cooling assembly of claim 1, wherein the channel comprises a cooling fluid disposed therein.

6. The rotor endwinding cooling assembly of claim 1, wherein the heated fluid is oil and the cooling fluid is at least one of oil, poly-alpha-olefin (PAO), water, glycol and combinations thereof.

7. The rotor endwinding cooling assembly of claim 1, wherein the channel defines a plurality of separate flow paths.

8. The rotor endwinding cooling assembly of claim 7, wherein at least two of the plurality of separate flow paths are fluidly coupled to one another and arranged in alternating or recursive patterns throughout the channel.

9. The rotor endwinding cooling assembly of claim 7, further comprising a plurality of conduits fluidly coupling at least two of the plurality of separate flow paths, wherein the plurality of conduits intersect at least one of the plurality of separate flow paths.

10. A rotating electric machine comprising:
    a rotor shaft formed about a longitudinal axis of rotation;
    a rotor body disposed about the rotor shaft and coupled thereto, the rotor body including a plurality of circumferentially-spaced, axially extending slots for receiving one or more conductors which extend axially beyond an end face of the rotor body to form one or more rotor endwindings;
    a stator body disposed about the rotor body, the stator body including a plurality of circumferentially-spaced, axially extending slots for receiving one or more conductors which extend axially beyond an end face of the stator body to form one or more stator endwindings; and
    a heat exchanger disposed proximate the rotor endwindings, the heat exchanger comprising:
       a body configured to be disposed proximate the rotor endwinding and coupled to a casing and an end shield of the rotating electric machine, wherein the body defines a cavity configured to capture a heated fluid expelled from the rotor endwinding; and
       a channel formed in the body, the channel fluidly coupled to a heat sink.

11. The rotating electric machine of claim 10, wherein the rotating electric machine is one of a motor or a generator.

12. The rotating electric machine of claim 10, wherein the one or more conductors which extend axially beyond an end face of the rotor body comprise one of concentrically arranged coils or conductor bars, that are connected at their ends to define the one or more rotor windings.

13. The rotating electric machine of claim 10, wherein the body comprises:
    a first portion having a concave shape; and
    a second portion coupled to the first portion, the second portion forming an inlet, wherein the inlet is fluidly coupled to the cavity.

14. The rotating electric machine of claim 10, further comprising a sump disposed proximate the body.

15. The rotating electric machine of claim 10, wherein the heated fluid is oil.

16. The rotating electric machine of claim 10, wherein the channel comprises a cooling fluid disposed therein.

17. The rotating electric machine of claim 10, wherein the channel defines a plurality of separate flow paths.

18. The rotating electric machine of claim 17, wherein at least two of the plurality of separate flow paths are fluidly coupled to one another and arranged in alternating or recursive patterns throughout the channel.

19. The rotating electric machine of claim 17, further comprising a plurality of conduits fluidly coupling at least two of the plurality of separate flow paths, wherein the plurality of conduits intersect at least one of the plurality of separate flow paths.

20. A method for cooling endwindings in a rotating electric machine, the rotating electric machine comprising:
    a heat exchanger comprising:
       a body configured to be disposed proximate a rotor endwinding and coupled to a casing and an end shield of the rotating electric machine, wherein the body defines a cavity configured to capture a heated fluid expelled from the rotor endwinding; and a channel formed in the body, the channel fluidly coupled to a heat sink, wherein the method comprises:

rotating a rotor body to expel a heated fluid from the rotor endwinding;

capturing the heated fluid expelled from the rotor endwinding in the heat exchanger.

21. The method of claim 20, wherein the step of capturing the heated fluid comprises, capturing the heated fluid in a body of the heat exchanger, wherein the body defines a first portion having a concave shape and a second portion coupled to the first portion, the first portion having a cooling fluid channel formed therein and fluidly coupled to a heat sink, the second portion forming an inlet for the heated fluid, wherein the inlet is fluidly coupled to a cavity.

* * * * *